(12) United States Patent
Helmerhorst et al.

(10) Patent No.: US 11,864,118 B2
(45) Date of Patent: Jan. 2, 2024

(54) METHOD AND APPARATUS FOR POWERING A LOW POWER MODULE FROM AN EXTERNAL DEVICE

(71) Applicant: AimValley B.V., Hilversum (NL)

(72) Inventors: Henk Helmerhorst, Koog aan de Zaan (NL); Bastiaan Pecht, Kudelstaart (NL); Niels Schipper, Almere (NL)

(73) Assignee: AIMVALLEY B.V., Hilversum (NL)

( * ) Notice: Subject to any disclaimer, the term of this patent is extended or adjusted under 35 U.S.C. 154(b) by 0 days.

(21) Appl. No.: 17/699,271

(22) Filed: Mar. 21, 2022

(65) Prior Publication Data

US 2023/0300754 A1    Sep. 21, 2023

(51) Int. Cl.
*H04W 52/02*    (2009.01)
*H04W 4/80*    (2018.01)

(52) U.S. Cl.
CPC ......... *H04W 52/0261* (2013.01); *H04W 4/80* (2018.02)

(58) Field of Classification Search
CPC ....................................................... H04W 4/80
See application file for complete search history.

(56) References Cited

U.S. PATENT DOCUMENTS

| | | | | |
|---|---|---|---|---|
| 4,839,530 | A * | 6/1989 | Greenwood | ........ B60R 16/0315 340/459 |
| 2003/0040291 | A1* | 2/2003 | Brewer | ................ H03G 1/0088 455/127.1 |
| 2019/0260215 | A1* | 8/2019 | Simsek | ................... H02J 50/20 |

* cited by examiner

*Primary Examiner* — Wen W Huang
(74) *Attorney, Agent, or Firm* — Ichthus International Law PLLC

(57) ABSTRACT

An apparatus for powering a low power communication module via a debug interface is provided. By way of example, a wireless communication device includes a low power communication module, an inverting power supply coupled to the low power communication module, a comparator coupled to the inverting power supply, and an input buffer including a capacitor and a diode. The input buffer is coupled to the comparator and is configured to store energy from a transmission signal line of a debug interface of another device. The comparator is configured to enable the inverting power supply to supply power when an amount of energy stored reaches a minimum threshold and switch off the power supply if a power demand is not sustainable or runs the TX line above a predetermined minimum space voltage.

12 Claims, 13 Drawing Sheets

METHOD AND APPARATUS FOR POWERING A LOW POWER MODULE FROM AN EXTERNAL DEVICE

TECHNICAL FIELD

The present disclosure relates to design and implementation techniques for powering a low power module, for example, by using one or more signal lines of an interface of another external device.

BACKGROUND

As more digital traffic is generated, there is an ever-increasing need for proving high speed, low latency connectivity, which has become crucial between data centers and many enterprise locations. For example, the proliferation of cloud-based business applications has resulted in a high demand for bandwidth needs and for faster speeds of connectivity at the edges of a network, which led to an increased need for having simpler and more cost-effective network interface devices supporting 10G rates and beyond.

To meet the rising high demands and needs, certain network demarcation devices, such as network interface devices (NID) as well as Photonic Service Demarcation (PSD) devices, are often deployed at customer premises. The NID and/or PSD devices are configured to provide network demarcation and optical transport for Ethernet and wavelength services, extending the reach of an optical network in support of 10G E-line or W-line services. When these devices are deployed at the customer premises, proper installation and provisioning of the devices are required. As such, NIDs and/or PSD devices often need to be connected with a wireless device such as a Bluetooth device so that the devices can establish wireless connectivity with a mobile phone, a tablet, or a laptop computer of a person who are installing or provisioning the devices and services at the customer premises. By way of example, when the Bluetooth technology is used, commercially available RS-232 to Bluetooth converters having a separate power line such as pin 9 of the RS-232 may be used, or other Bluetooth devices with an external power or a battery for the purpose of powering the Bluetooth devices may be used. Also, RS232 to Bluetooth dongle may be used for this purpose. This is the source of inconvenience and need for carrying additional devices or equipment for the installation or provisioning purposes at the customer premises.

Thus, there is a further need for more advanced, cost-effective technology for providing power to a certain wireless device without relying on having an external power adaptor, battery or hardware or software modification on the network devices. For example, there is a need for advanced, cost-effective technology for providing power to a wireless device without relying on the external power adaptor, battery or hardware or software modification on the network demarcation devices.

SUMMARY

The present disclosure discloses and provides advanced, cost-effective technology for providing power to a wireless device without having a need for an external power adaptor, battery or hardware or software modification on network demarcation devices. For example, in an aspect of the present disclosure, a wireless communication device may include a low power communication module, a power supply (e.g., an inverting or non-inverting power supply or combination thereof) coupled to the low power communication module, a comparator coupled to the power supply, and an input buffer including a capacitor and a diode. The input buffer may be coupled to the comparator, where the input buffer is configured to be electrically coupled to a transmission (TX) signal line of an electrical interface, such as a configuration, management, or debug interface of another external device. Further, the comparator may be configured to enable the power supply to supply power when an amount of energy stored in the energy storage reaches a minimum threshold, and switch off the power supply if a power demand is not sustainable or runs the TX signal line above a predetermined minimum space voltage. The power supply may include an inverting power supply, non-inverting power supply or combination thereof.

In another aspect of the present disclosure, the debug interface may comprise a RS232; RS422, or RS485 interface.

In an aspect of the present disclosure, the energy storage of the input buffer may be charged through the TX signal line of the RS232 interface of another device.

In an aspect of the present disclosure, the low power communication module may comprise a Bluetooth low energy (BLE) module.

In another aspect of the present disclosure, the low power communication module may comprise an external temperature sensor module, a GPS receiver module, a pressure sensor module, a humidity sensor module, or a $CO_2$ sensor module. Further, in another aspect, the low power communication module may be configured to receive power from the RS232 or RS485 interface of an external device.

In another aspect of the present disclosure, the power supply may be configured to provide power to one or more auxiliary components disposed in the wireless communication device.

In another aspect of the present disclosure, the one or more auxiliary components may comprise a TX line driver, a RX line driver, or the like.

In another aspect of the present disclosure, the power supply may be configured to provide power to the BLE module at an output voltage of +3V when the inverting power supply is enabled by the comparator.

In another aspect of the present disclosure, the wireless communication system may further include a line receiver coupled to the BLE module, where the line receiver is configured to interface with the TX signal line of the RS232, RS422, or RS485 interface of another device and an output of the line receiver is coupled to an input of the BLE module.

BRIEF DESCRIPTION OF THE DRAWINGS

These and other features, aspects and advantages of the present disclosure will become better understood from the following description, appended claims, and accompanying figures where:

DETAILED DESCRIPTION OF EMBODIMENT(S)

Figure 1:
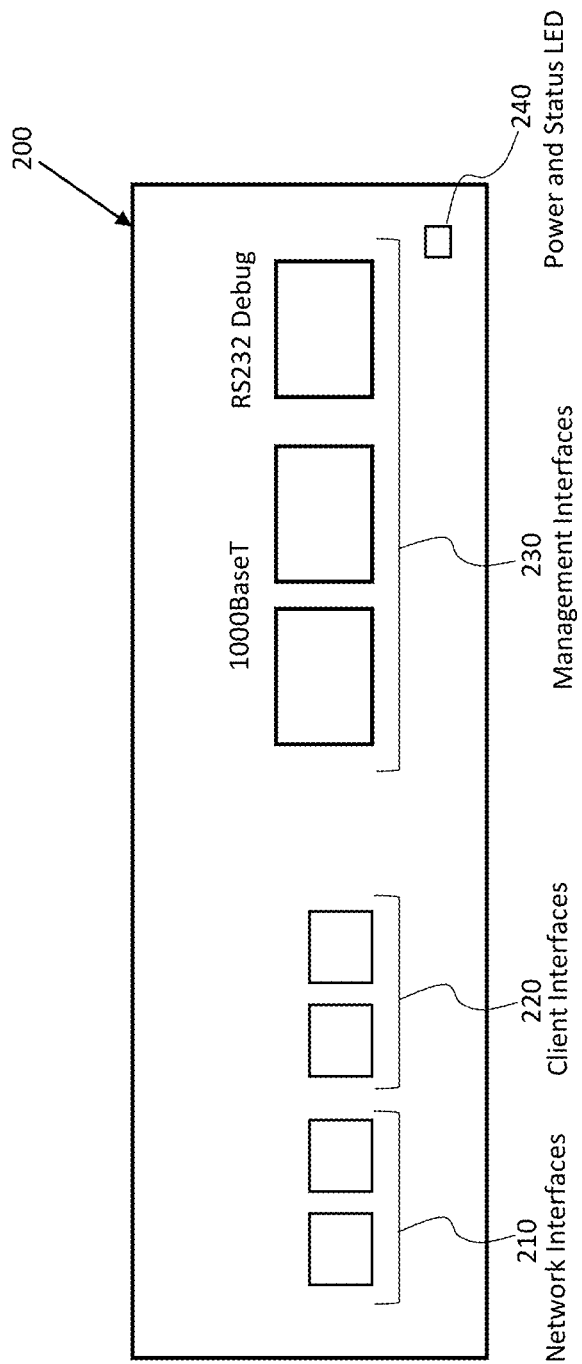
FIG. 1 is a diagram conceptually illustrating an example host device in an aspect of the present disclosure.

The detailed description of illustrative examples will now be set forth below in connection with the various drawings. The description below is intended to be exemplary and in no way limit the scope of the present technology. It provides a detailed example of possible implementation and is not intended to represent the only configuration in which the concepts described herein may be practiced. As such, the detailed description includes specific details for the purpose of providing a thorough understanding of various concepts, and it is noted that these concepts may be practiced without these specific details. In some instances, well known structures and components are shown in block diagram form in order to avoid obscuring such concepts. It is noted that like reference numerals are used in the drawings to denote like elements and features.

Further, methods and devices that implement example embodiments of various features of the present technology are described herein. Reference in the description herein to "one embodiment" or "an embodiment" is intended to indicate that a particular feature, structure, or characteristic described in connection with the example embodiments is included in at least an embodiment of the present technology or disclosure. The phrases "in one embodiment" or "an embodiment" or "an example embodiment" in various places in the description herein are not necessarily all referring to the same embodiment.

In the following description, specific details are given to provide a thorough understanding of the example embodiments. However, it will be understood by one of ordinary skill in the art that the example embodiments may be practiced without these specific details. Well-known circuits, structures and techniques may not be shown in detail in order not to obscure the example embodiments (e.g., circuits in block diagrams, interconnects, etc.).

FIG. 1 is a high level diagram conceptually illustrating a device or an external host device 200 such as a network demarcation and optical transport device for Ethernet and wavelength services in support of wholesale and business applications. In the example, the external host device 200 may be a Photonic Service Demarcation (PSD) device, which is a low latency, or a compact and versatile Network Interface Device (NID) providing network demarcation at customer premises. The PSD device is often used to extend the reach of an optical network in support of 10G Ethernet and wavelength services, leveraging the same optics (SFPs) used in the common network operations. The PSD may enable a wide range of applications and services such as network/service extension, network interconnection/access, as well as service interworking.

In this disclosure, for the sake of simple presentation and an exemplary embodiment, the PSD device or the like and designs thereof are used herein to illustrate various aspects of the present technology. The PSD device 200 shown in FIG. 1 includes network interfaces or ports 210, client interfaces or ports 220, management interfaces or ports 230, and a power and status LED 240. The management interfaces 230 may include 1000BaseT ports and a RS-232 Debug port for internetworking as well as connecting with other additional devices.

Figure 2A:
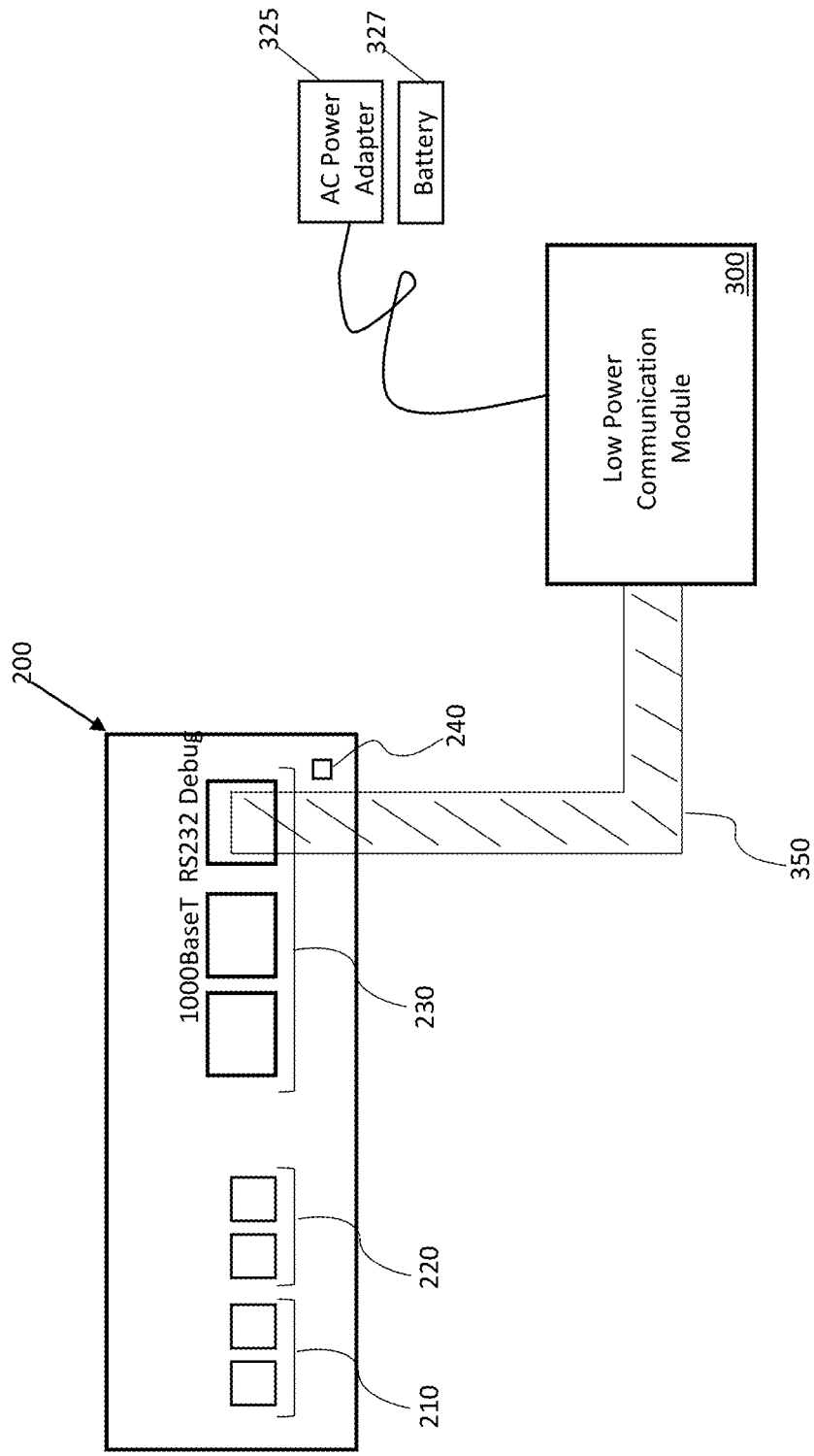
FIG. 2A is a diagram conceptually illustrating an example configuration setting in an aspect of the present disclosure.

FIG. 2A conceptually illustrates an exemplary configuration setting of an external host device 200 and a low power communication module 300 which is coupled to the external host device 200 via an interface cable 350 during a provisioning stage by a person at a customer premise site. For example, to set-up and provision the external host device 200, e.g., a PSD device, the low power communication module 300, such as a Bluetooth low energy module, may be connected through the RS-232 debug interface of the external host device 200 via the interface cable connection 350. In the example, the low power communication module 300 is coupled to an alternating current (AC) power adaptor and is powered through the external AC power adaptor or alternatively powered through an external battery. This means that during the provisioning stage, the person at the customer premise site need to have an AC power adaptor or a battery for the operation of the low power communication module 300 and carry them for their provisioning task at the customer premise site.

Figure 2B:
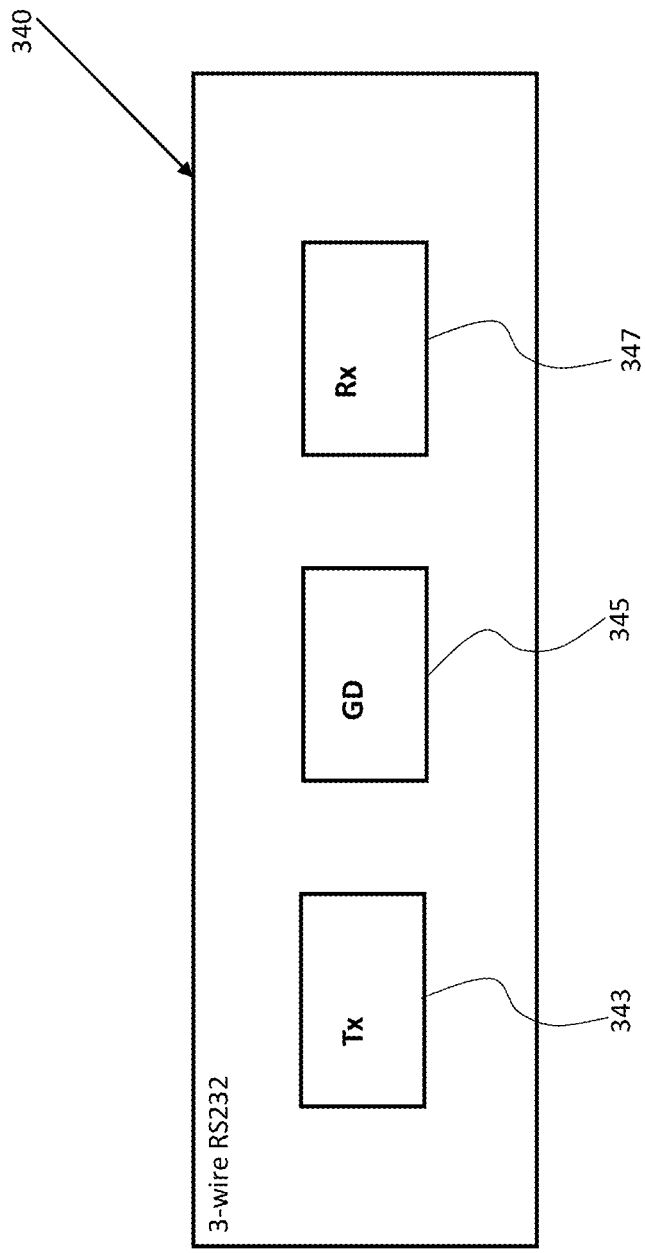
FIG. 2B is a diagram conceptually illustrating an example of signals present in a debug interface of the embodiment shown in FIG. 2A in an aspect of the present disclosure.

FIG. 2B conceptually illustrates an exemplary embodiment of the debug interface of the external host device of FIG. 2A. By way of example, although the debug interface of FIG. 2B is a 3-wire RS-232 interface, according to various aspects of the present disclosure, the debug interface of the external host device may include various other types of debug interfaces such as RS-422, RS485, or the like which may include more than 3 wires. In the present disclosure, for the illustration purposes, the 3-wire debug RS-232 interface 340 is used. The 3-wire debug RS-232 interface of FIG. 2B may include a minimal format consisting only of transmit data (Tx), receive data (Rx), and ground (GD). That is, in the example, the debug RS-232 interface 340 includes a transmit data (TX) line 343, a receive data (RX) line 347, and ground (GD) line 345. In another aspect of the present disclosure, however, a 2-wire connection, e.g., data and ground, may be used, instead of the 3-wire RS-232 connection, where the data line is capable of supporting TX/RX full duplex communication. Alternatively, in another aspect of the present disclosure, other interface standards including differential transmit and receive lines may be used. Further, the debug interface may include another example of 2-wire connection for a case of a low power module which does not require bidirectional traffic with the host unit, but only need unidirectional traffic from the host to the module, for example, a status indictor from the host indicating the status of a process running inside the host, which needs to be indicated to the user, but there is no indicators present on the host.

In the RS-232 standard, user data may be sent as a time series of bits, either in synchronous or asynchronous transmission. Further, the RS-232 standard defines the voltage levels that correspond to logical one and logical zero levels for the data transmission and the control signal lines. Thus, valid signals for the RS-232 standard are either in the range of +3V to +15V or the range −3V to −15V with respect to the common ground (GD) 345. From the perspective of the debug port, the TX line 343 is a signal line for transmission of data and the RX line 347 is a signal line for receiving data, in accordance with the RS-232 standard.

Figure 2C:
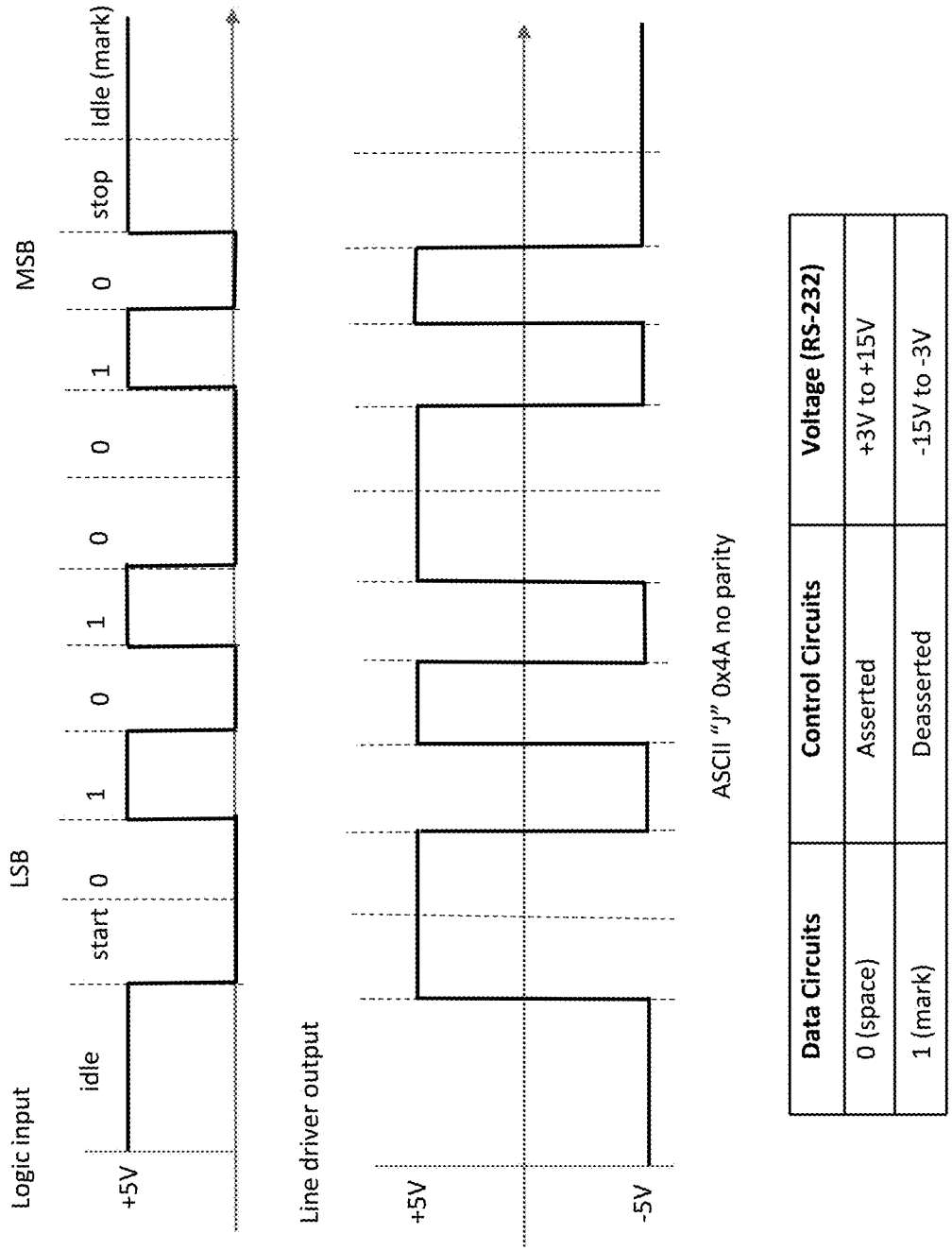
FIG. 2C are logic diagrams of an example embodiment according to an aspect of the present disclosure.

By way of example, the RS-232 communications bits and levels are conceptually illustrated in FIG. 2C for transmitting one ASCII "J" character over an RS-232 line running from the TX output on a transmitter end to the RX input on a receiver end. Also, FIG. 2C illustrates RS-232 levels when asserted as well as deasserted. It is noted that in the example, when the line is in an 'idle state,' the voltage is low on the line (Mark, −5V) and the 8 bits representing the ASCII character are sent. When no new characters are to be sent, the line will go back to 'Idle state,' (Mark, −5V). Further, it is noted that as shown in FIG. 2C, the minimum voltage for proper communication is +3V (space) and −3V (mark) and the voltage should be kept above this voltage for guaranteed transmission of data.

Figure 2D:
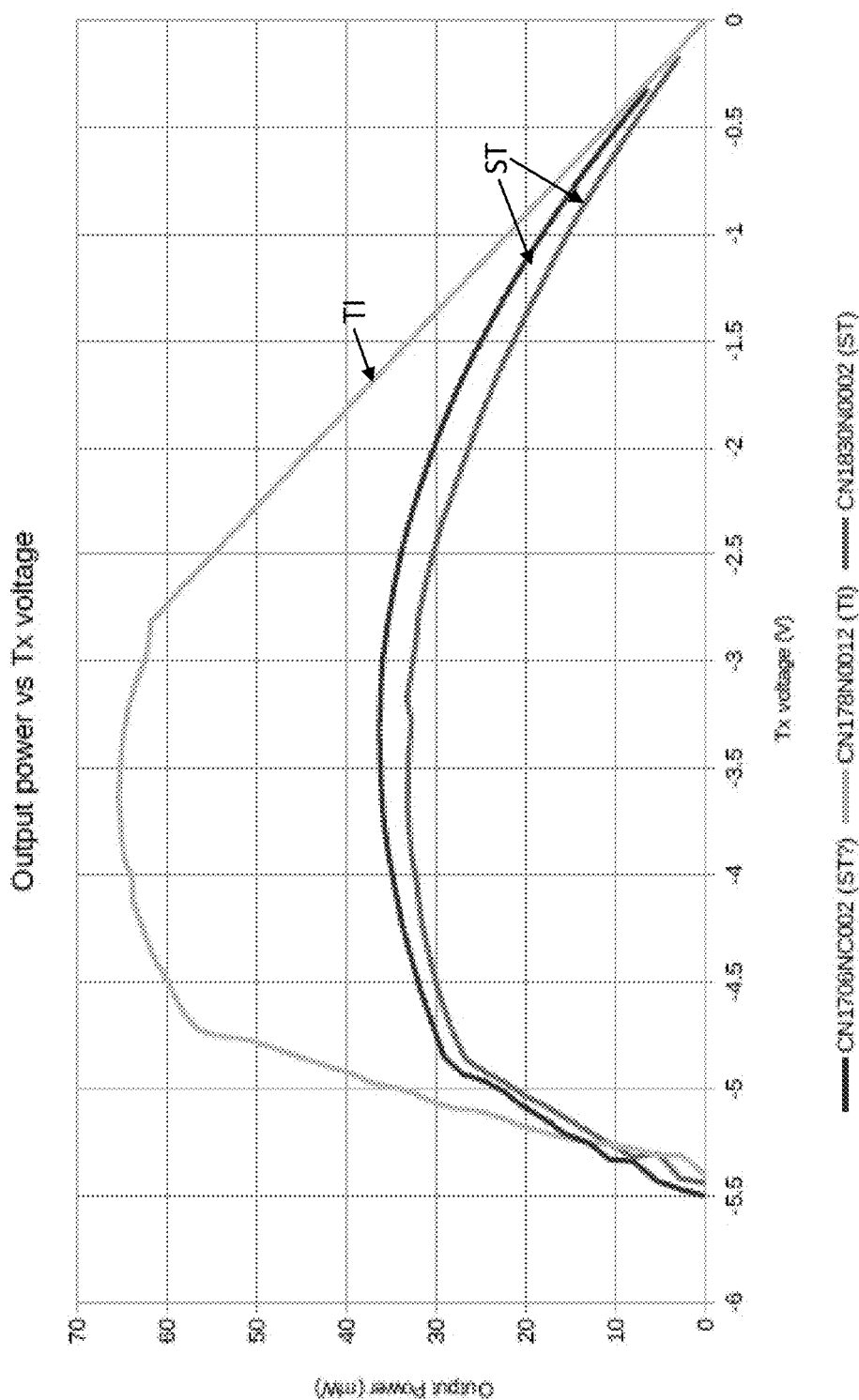
FIG. 2D is an output power diagram conceptually illustrating example embodiments according to an aspect of the present disclosure.

Further, FIG. 2D illustrates some characteristics of typical output power over TX voltage in accordance with an aspect of the present disclosure. The RS-232 interface is often driven from a MAX3232 or equivalent device from the external PSD host device. For example, in one or more implementations, TI MAX3232CDR or ST3232ECDR/ST3232EBDR chips may be used to drive the RS-232 interface. FIG. 2D illustrates experimental measurement data using those chips for the output power over negative TX voltage, from which the available power over TX voltage may be determined. From FIG. 2D, it can be noted that the available power from the TI device (e.g., TI MAX3232CDR) is significantly higher than the power from the ST devices (e.g., ST3232ECDR/ST3232EBDR) and the voltage at which the maximum power is available is the same, around −3.3V. It is further noted that the power curve as shown in FIG. 2D is flat around the maximum, thus making the need for a dedicated threshold for both suppliers (TI and ST) unnecessary. Also, it is noted that from −3.3V up, the available power reduces and thus it is not going to be useful to operate the device (e.g., a low power communication module 400) at a voltage above the maximum value.

Figure 3:
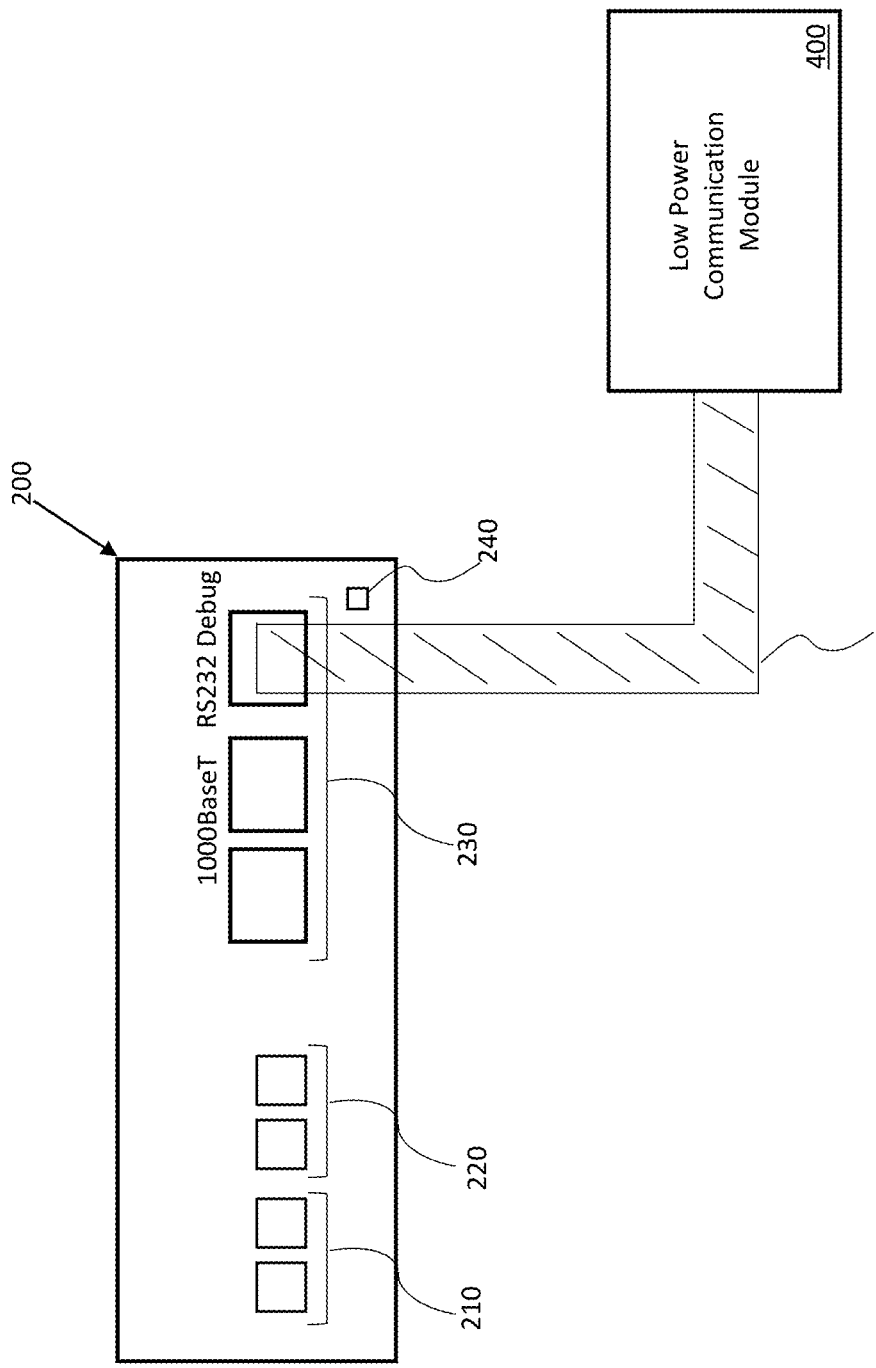
FIG. 3 is a diagram conceptually illustrating an example configuration setting in an aspect of the present disclosure.

FIG. 3 conceptually illustrates an exemplary setup and embodiment configuration of the external host device 200 and a low power communication module 400 in accordance with an aspect of the present disclosure, during the provisioning stage at the customer premise site. For example, in an aspect of the present disclosure, the low power communication module 400 is configured to be powered through the RS-232 debug interface via the interface cable connection 350, during the provisioning by an installation person at the customer premise site. That is, at the customer premise site, without having a need for an additional power supply or AC power adaptor or battery for the operation of the low power communication module 400, the low power communication module 400 may be powered from the external host device 200 (e.g., a PSD device). Thus, various aspects of the present disclosure allow for the provisioning of the external host device 200 through the low power communication module 400, using a Phone, a tablet, or a laptop by the visiting installation personnel at the customer premise site in an easy and convenient manner. Further, in one or more aspects of the present technology, the present disclosure provides power to the low power communication module 400, without having a need for implementing additional design change to the external host device 200, for example, a separate power line such as a pin 9 of the RS-232 debug interface for the purpose of powering the low power communication module 400.

In an aspect of the present disclosure, in particular, the low power communication module 400 may be configured to harvest energy or receive power from a TX signal line of the RS-232 debug interface of the external host device 200. That is, the TX line of the RS-232 debug interface shown in FIG. 2B may be utilized as a power line as well as a data communication line between the external host device 200 and the low power communication module 400. In one implementation, the low power communication module 400 may include a Bluetooth low energy (BLE) technology which enables device manufacturers to add a low power communications interface on existing solutions. Thus, as mentioned above, the present disclosure enables provisioning of the external host device 200 using a phone, a tablet, or a laptop, via the low power communication module 400 alone, without having any external power adaptor or a battery for the lower power communication module 400.

Figure 4:
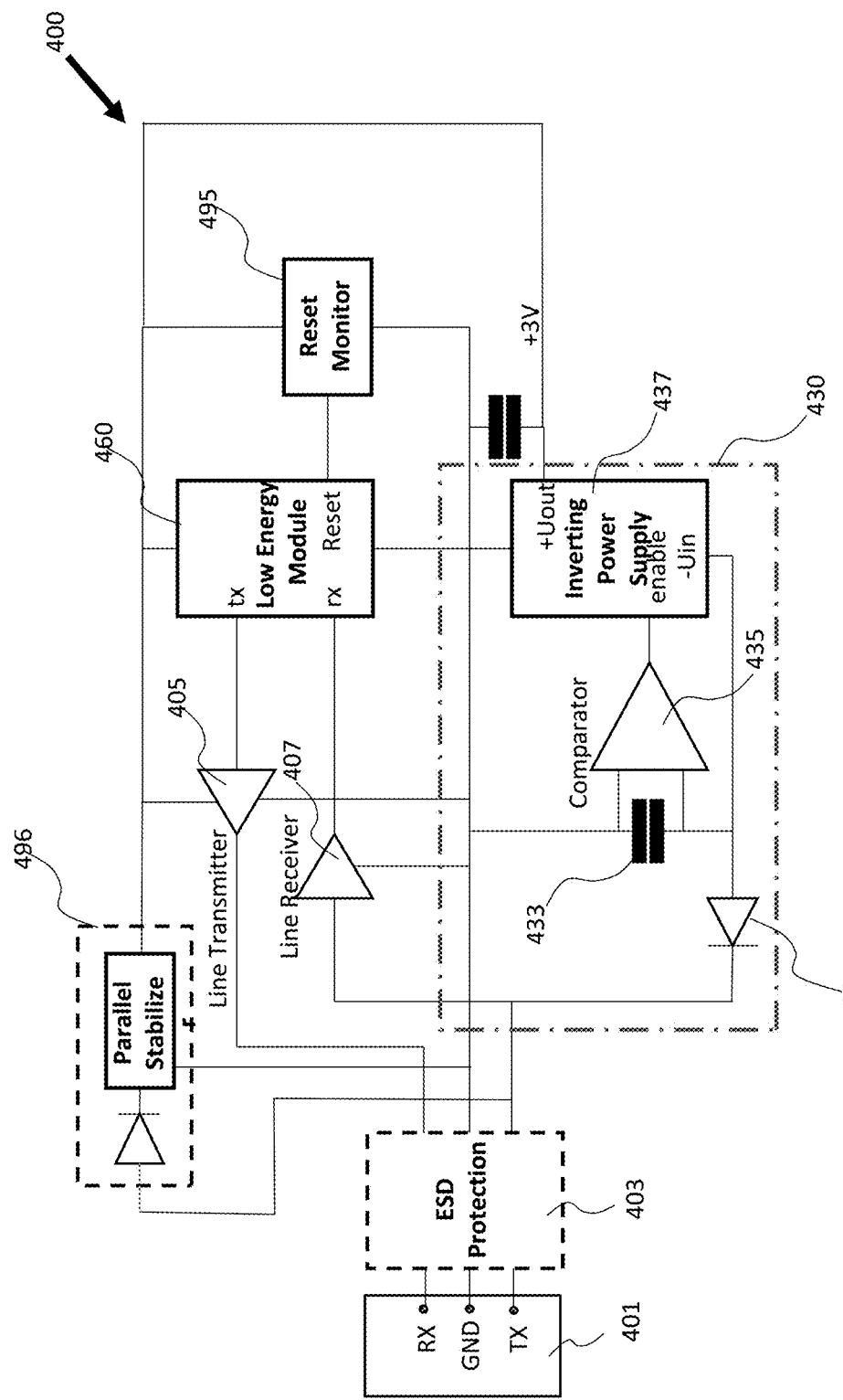
FIG. 4 is a block diagram conceptually illustrating an example hardware embodiment in an aspect of the present disclosure.

FIG. 4 is a high level block diagram conceptually illustrating an exemplary hardware embodiment of the present technology in an aspect of the present disclosure. As mentioned above, a device like the embodiment of FIG. 4 may be used to allow service or installation personnel of an external host device (e.g., a PSD) to set up a wireless communication link, for example, a Bluetooth link, with a mobile phone, tablet or laptop computer, for the purpose of provisioning the external host device and without having a need for an external power supply or battery.

By way of example, FIG. 4 shows schematic details of an exemplary embodiment in an aspect of the present disclosure. In one implementation, the low power communication module 400 of FIG. 3 may include various components or modules as shown in FIG. 4. That is, the low power communication module 400 shown in FIG. 4 may include various design blocks such as an external interface 401, a line transmitter 405, a line receiver 407, a low energy module 460 (e.g., a low power Bluetooth LE module, an environmental sensor module for temperature, humidity, orientation, etc.), a reset monitor 495, and a power supply module 430. The power supply module 430 also may be coupled to the external interface 401 and the low energy module 460. Further, the low power communication module 400 may optionally include an ESD protection unit 403 and/or a parallel stabilizer unit 496.

In the example of FIG. 4, the external interface 401 may be configured to receive input or output from/to an external device 200, via various communication standards, such as RS-232, RS-422, RS-485 or the like. By way of example, in the present disclosure, the external interface 401 is configured to communicate with the external device 200 via RS-232 protocol, but the present disclosure is not limited thereto, and may include other communications protocols. Thus, in the example, the external interface 401 may be configured to interface with or connect to a transmission signal (TX) line, a reception signal (RX) line and a ground signal (GND) from the external device 200 (e.g., a PSD). It is noted that in the present disclosure, the external device 200 may be referred to as "an external host device."

As mentioned earlier, the external interface 401 may be configured to interface with a debug port of the external host device 200 via RS-232 protocol, for example. It is noted that the external interface 401 may be configured to interface with a debug port of the external device 200 via other communications protocol, such as RS-422, RS-485, etc. However, for the illustration purposes, the embodiment using the RS-232 protocol is described herein but without any limitation thereto. As such, in the example, the debug port of the external host device 200 may include a RS-232 debug interface including a TX line, a RX line, and a Ground line as shown in FIGS. 1 and 2. That is, the debug interface may carry the TX and RX line of an RS-232 interface. Thus, in an aspect of the present disclosure, the TX line of the external host device 200 may be configured to include two functions: a normal TX function and a power source for all functionality residing in the low power communication module 400. In particular, when the low power communication module 400 is connected to the external host device 200, via the RS-232 interface, the TX line of the RS-232 interface may be in an idle state and the TX line of the debug interface of the external host device 200 may be at −5.4 V. As such, according to an aspect of the present disclosure, the low power communication module 400 may be powered up from the TX line of the debug interface of the external host device 200. Conceptually, during an initial stage of a power-up, when the TX line is mostly in the idle state, the TX line may be used to provide power to the low power communication module 400 when the TX line is at a mark or −5V (no data is sent). It is noted that during data transmission using the RS-232 protocol, data consisting of bits is sent at start bit, or "space" at +5V and the transmission is completed with a stop bit, or "mark" at −5V. And at the idle state, e.g., no data is transmitted, the TX line is at the mark state at −5V.

Based on these observations and using these characteristics as well as various aspects of the present disclosure, in one implementation, when the low power communication module 400 is connected to the external host device 200, the low power communication module 400 may be powered from the negative voltage on the TX line of the debug interface 401 of the external host device 200 only; that is, without having any additional or separate power source as in conventional technology.

In another aspect of the present disclosure, in a different application and/or implementation, the RX line of the interface 401 may be used for broadcasting commands. Further, in another application, the TX line of the interface 401 may be used only for power and the RX line of the interface 401 is used for listening to messages from external client devices.

Referring back to FIG. 4, in the exemplary low power communication module (or wireless communication module) 400, the external interface 401 is coupled to the power supply module 430. In an aspect of the present disclosure, the power supply module 430 is configured to include various components such as an inverting power supply 437, a comparator 435, a capacitor 433, and a diode 431. The inverting power supply 437 may be a LTC3459 Boost Converter configured to provide power to an application at a certain output voltage, e.g., +3V and both the input and output voltage may be referred to the same ground. The inverting power supply 437 may be coupled to the comparator 435, which is configured to enable the operation of the inverting power supply 437 when a certain condition is satisfied. That is, via an enable line, the inverting power supply becomes operational when the comparator sends an enable signal to the inverting power supply 437. In the example, in an aspect of the present disclosure, it is noted that the switching device is referred to a rectified or buffered input voltage of about −4.5V and the output is referred to a ground, which avoids the need for having additional level shifting or isolated power supplies. Further, in the implementation of the low power communication module 400, to stabilize the output voltage to 3V, a feedback signal from the output voltage may be used.

In the example, from an operational perspective, the comparator 435 is configured to enable the power supply 437 such that the power supply 437 supplies power to one or more components in the low power communication module 400, once sufficient energy is stored in one or more buffer capacitors (e.g., capacitor 433 or the like), which may be charged through one or more diodes 431 or the like through the energy harvested from the TX line of the interface 401. Also, the comparator 435 may be configured to switch off the power supply if the power demand is not sustainable or runs the TX line above a minimum space voltage, e.g., −3V. As a result, the comparator 435 may be configured to switch on or off based on a predetermined minimum threshold. In the present disclosure, the predetermined minimum threshold may determine how much energy may be buffered in the one or more buffer capacitors of the power supply module 430 before the power supply is switched on. By way of example, in case that the minimum output voltage of the driver is −5V, then the predetermined minimum threshold voltage of the comparator 435 may be set at −4.5V. Further, the one or more buffer capacitors may be designed to store or buffer a sufficient amount of energy for a smooth operation of the low power communication module 400.

In the example, the low energy module 460 of the low power communication module 400 may be implemented by a Bluetooth low energy module, e.g., ENW-89853A1KF from Panasonic and powered through the power supply module 430. Also, the embodiment of the low energy module 460 may be implemented in other low energy modules such as low energy temperature sensors, environmental sensors or the like found in various industrial and/or IoT devices. Further, the low energy module 460 may be an integrated module with one or more antennas for communication with other devices. In the example, the Bluetooth low energy module may be configured to support Bluetooth Low Energy 5.0 with an integrated antenna to enable wireless connectivity with other devices, such as a mobile phone, a tablet, a laptop or portable computer, or the like.

In another aspect of the present disclosure, in the low power communication module 400, the reset monitor 495 may be coupled to the low energy module 460. As such, the reset monitor 495 may be configured to reset the low energy module 460 when the supply voltage is below a minimum supply voltage for the low energy module 460, for example, 1.8V for the Bluetooth LE (BLE) module. Further, the reset monitor 495 is configured to keep the BLE module in reset as long as the output voltage of the power supply module 430 is not at the minimum required level during the power-up process, which avoids having undefined states.

In another aspect of the present disclosure, in the example of FIG. 4, the low power communication module 400 may include a RS-232 line receiver and RS-232 line transmitter (e.g., the line receiver 407 and the line transmitter 405 coupled to the low energy module 460) to interface the external interface 401 and the low energy module 460. In the example, the line receiver 407 may be implemented with a low power single line receiver (e.g., MAX3180 single line receiver), which may be powered from 3.0V and interface directly with the TX line of the debug interface from the external device 200 via the external interface 401. The output of the line receiver 407 may be coupled to a receive line of the low energy module 460. It is noted that the RS-232 protocol or standard requires a TX signal with an output voltage of +/−3V minimum, but depending upon a receiving component in the external host device 200, a TTL driver may be used. In one implementation, with a minimum high level of 2.72V and a maximum low level of 0.31V, the TTL driver may be implemented in a simple, low power gate device such as AUP1G00 which then is used in driving the receiving component, e.g., MAX3232 in the external host device 200.

Further, as shown in FIG. 4, in another aspect of the present disclosure, the low power communication module 400 may optionally include the ESD protection 403 which is configured to protect the internal circuitry of the low power communication module 400 from certain electrical overstress and failures due to electrical overstress or electrostatic discharge (ESD) coming from the external host device 200 when the low power communication module 400 is connected to the external host device 200 via the interface 401 or the debug interface of the external host device 200. Further, the electrical overstress may occur due to a service person during the installation process while making the connection to the host. The service person may carry electric charge on his or her body which may be equalized via the module and/or the host during plugging of the module in the host.

Furthermore, in another aspect of the present disclosure, the low power communication module 400 may optionally include the parallel stabilizer 496. The parallel stabilizer 496 may be configured to provide power to the application when the Tx line of the interface 401 transmits a space (+3V to +15V). The Tx line may be connected to the +3V via the diode in the parallel stabilizer 496. During the space period, energy may be transferred from the TX line to the +3V power supply. To avoid that during this period the voltage on the 3V power supply may increase too much, the parallel stabilizing circuit may be implemented to clamp the voltage at a level slightly above the nominal voltage and well below the maximum supply voltage, e.g., 3.1V.

In another aspect of the present disclosure, in addition to harvesting the power from the TX line of the interface 401 when it is driven to a negative voltage, as described above, alternatively, power on the TX line of the interface 401 may be harvested when it is at a positive voltage, for example, at a space voltage.

Figure 5:
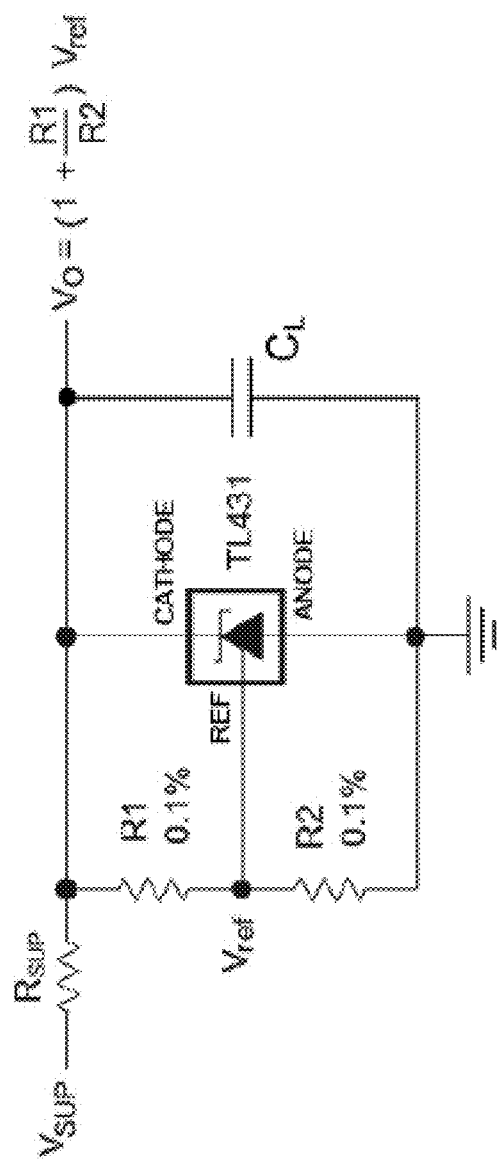
FIG. 5 illustrates another example embodiment in accordance with an aspect of the present disclosure.

FIG. 5 illustrates an exemplary embodiment of the present technology in an aspect of the present disclosure. In one implementation, just like the negative power supply option where only the negative voltage swing (−3V to −15V) is used above, power may be harvested when there is a positive voltage on the TX signal of the interface 401. In such implementation, a Schottky diode may be used to block negative voltage on the TX line voltage and behind the rectifying diode, the voltage may be clamped using a configurable Zener diode, e.g., TL431, as shown in FIG. 5. In the example, $V_{ref}$ on the TL431 may be set to configure the Zener voltage, e.g., the voltage that the Zener regulates or clamps at, e.g., 3.1V, which is 0.1V higher than the voltage on the internal power supply (e.g., 3.0V). The voltage is then stabilized using a parallel stabilization technique. In the exemplary configuration, the positive voltage on the TX line of the interface 401 may be clamped at a voltage of about 3.4V, which is higher than the minimum "space" voltage of 3.0V, thereby allowing for a proper signal level on the TX line of the interface 401. Further, as shown in FIG. 5, a basic configuration of the TL431 is illustrated. R1 and R2 may be determined accordingly and for $R_{sup}$, the internal resistor of the TX driver in the host may be used in the example.

Figure 6A:
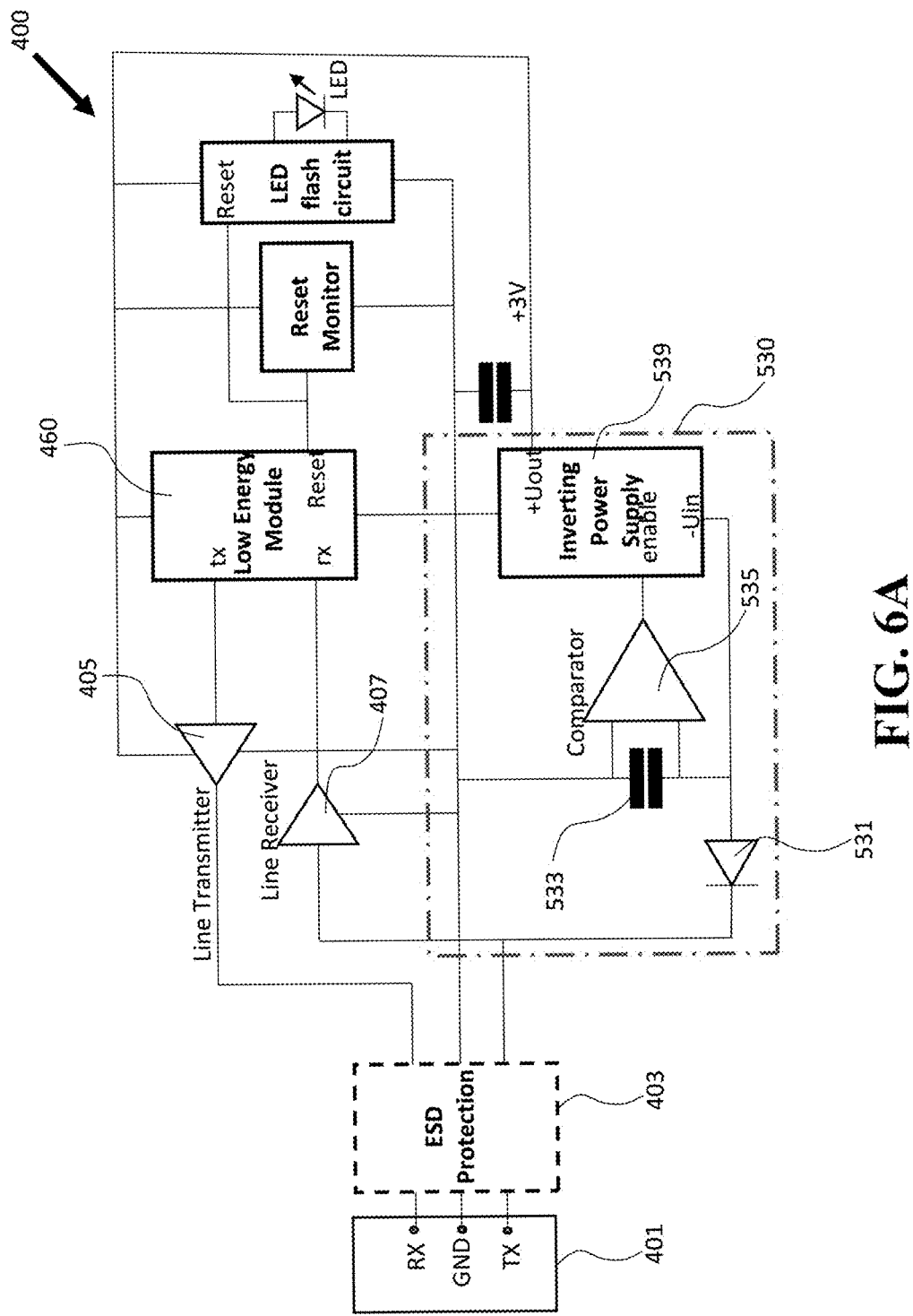
FIGS. 6A-6E illustrate various exemplary embodiments of the present technology in accordance with various aspects of the present disclosure.
Figure 6B:
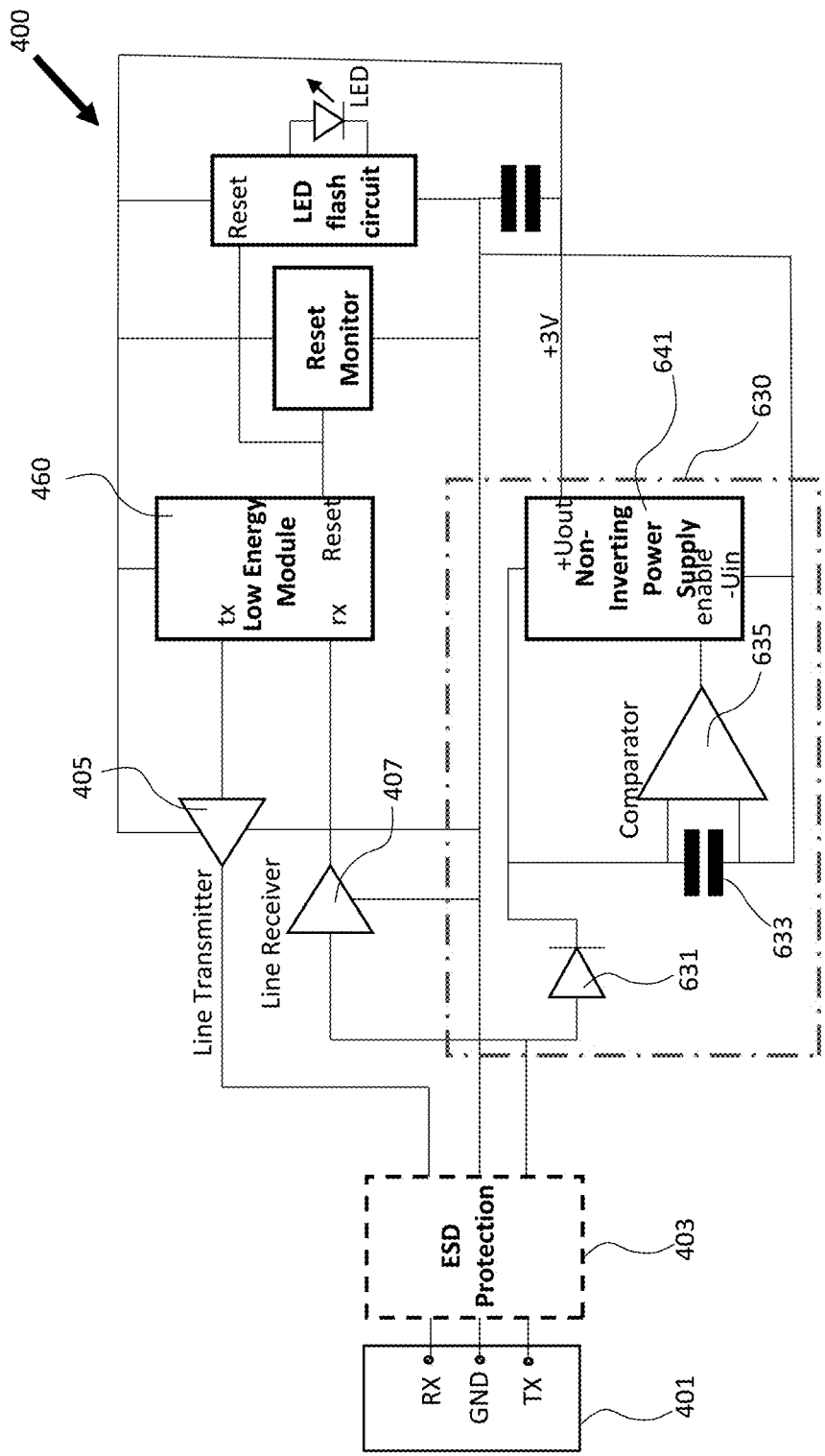

FIGS. 6A-6E illustrate various exemplary embodiments of the present technology in aspects of the present disclosure. FIG. 6A illustrates an exemplary embodiment in which the low power module 460 (e.g., a BLE module) is configured to receive power from a single ended TX line with a negative idle state, through the power supply module 530, which includes an inverting power supply 539, a comparator 535, a capacitor 533, and a diode 531. The comparator 535 is configured to turn on or off the non-inverting power supply 539 based on the energy stored in the capacitor 533. As such, the power supply module 530 is configured to harvest energy from the TX line of the interface 401 on the negative idle state and supply power to the low energy module 460. FIG. 6B illustrates another exemplary embodiment in which the low energy module 460 is configured to receive power from the single ended TX line with a positive idle state, through the power supply module 630, which includes a non-inverting power supply 641, a comparator 635, a capacitor 633, and a diode 631. The comparator 635 is configured to turn on or off the non-inverting power supply 641 based on the energy stored in the capacitor 633. As such, the power supply module 630 is configured to harvest energy from the TX line of the interface 401 on the positive idle state and supply the power to the low energy module 460.

Figure 6C:
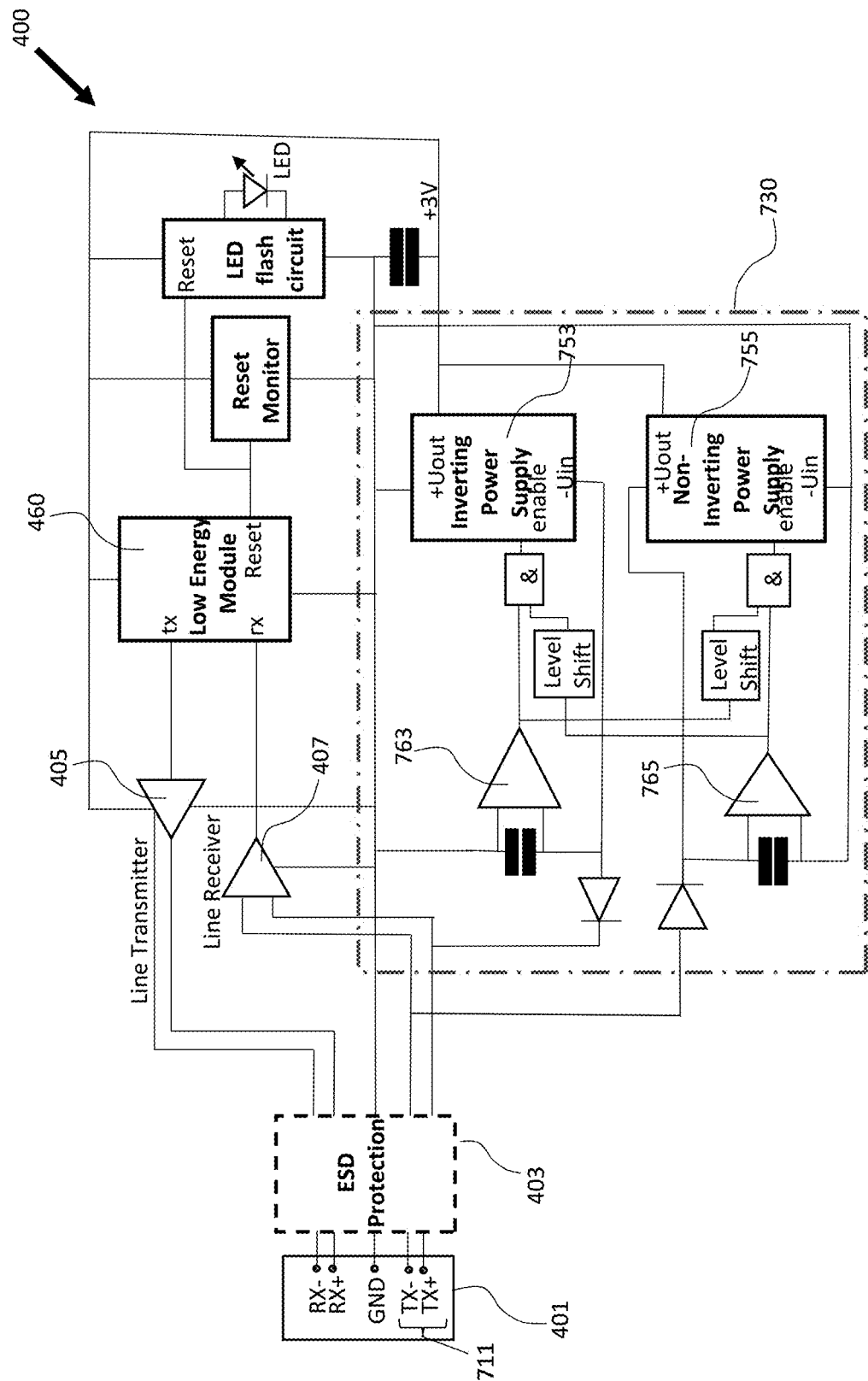

FIG. 6C illustrates an exemplary embodiment of the present technology, in which the low energy module 460 is configured to receive power from differential TX lines 711 with a negative idle state, through the power supply module 730. The power supply module 730 includes an inverting power supply 753 and a non-inverting power supply 755, comparators 763, 765, level shifts, AND (&), and diodes. The arrangement of the comparators 763, 765, capacitors, level shifts, AND (&) and diodes may be made so as to harvest energy from the differential TX lines 711 and to supply the operational power to the low energy module 460, in accordance with an aspect of the present disclosure. Further, the differential TX lines 711 include two TX lines that work in tandem—positive and negative signals (+, −). Some of the communications protocols that support differential signals may include RS-422, RS-485, or other variants. The comparators 763,765 are configured to turn on or off the inverting or non-inverting power supplies 753,755 based on the energy stored in the capacitors coupled to the comparators 763,765.

Figure 6D:
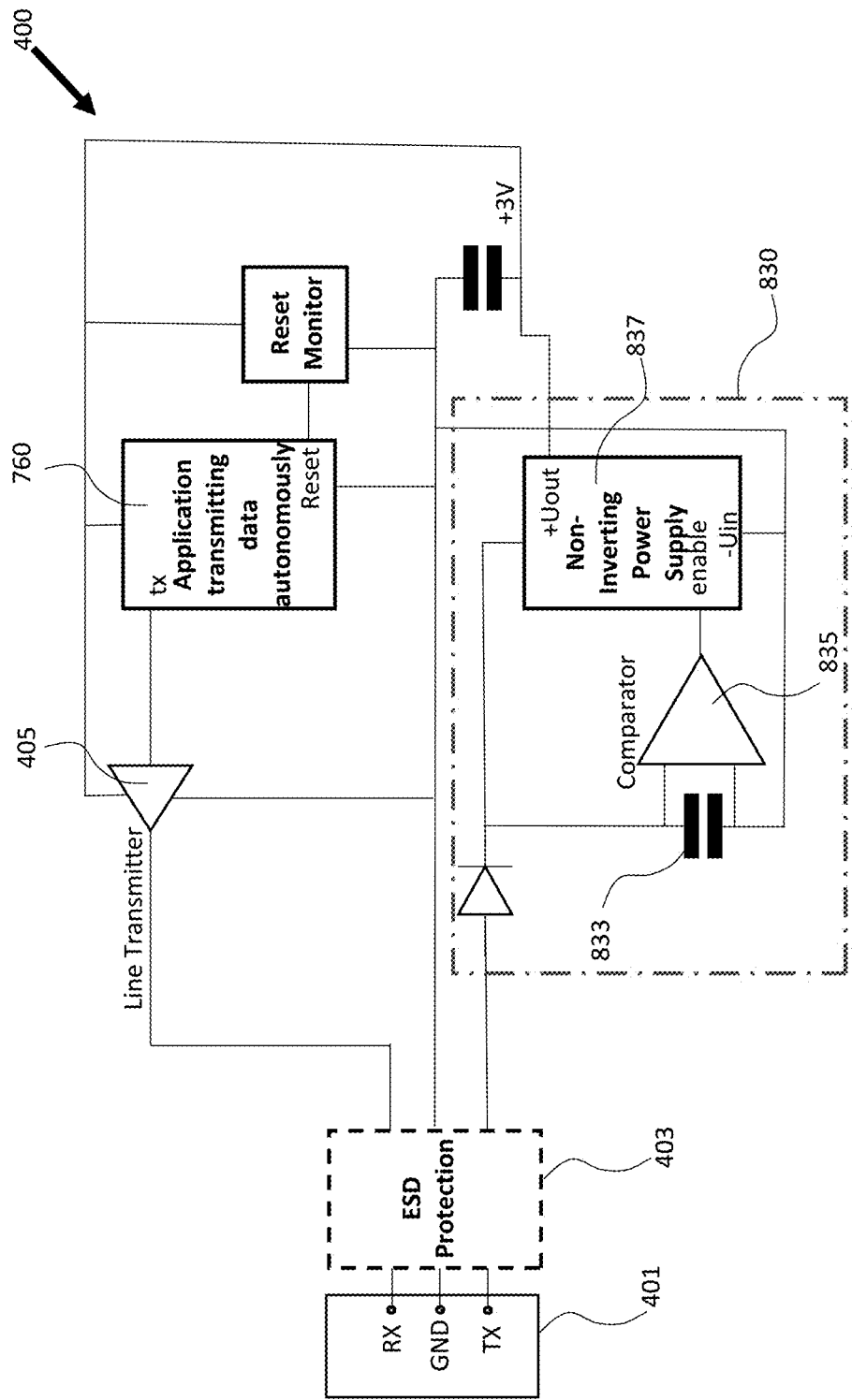

In another aspect of the present disclosure, FIG. 6D illustrates an exemplary embodiment of the present technology in which an application module 760 is configured to receive power from a single ended TX line of the interface 401 with a positive idle state, through the power supply module 830. The application 760 is configured to transmit data autonomously and the power supply module 830 is configured to include a non-inverting power supply 837, a comparator 835 coupled to the non-inverting power supply 837, a capacitor 833 coupled to a diode and the non-inverting power supply 837. As a result, in an aspect of the present disclosure, the application 760 is configured to harvest or receive the operational power from the single ended TX line of the interface 401 through the power supply module 830. The comparator 835 is configured to turn on or off the non-inverting power supply 837 based on the energy stored in the capacitor 833.

Figure 6E:
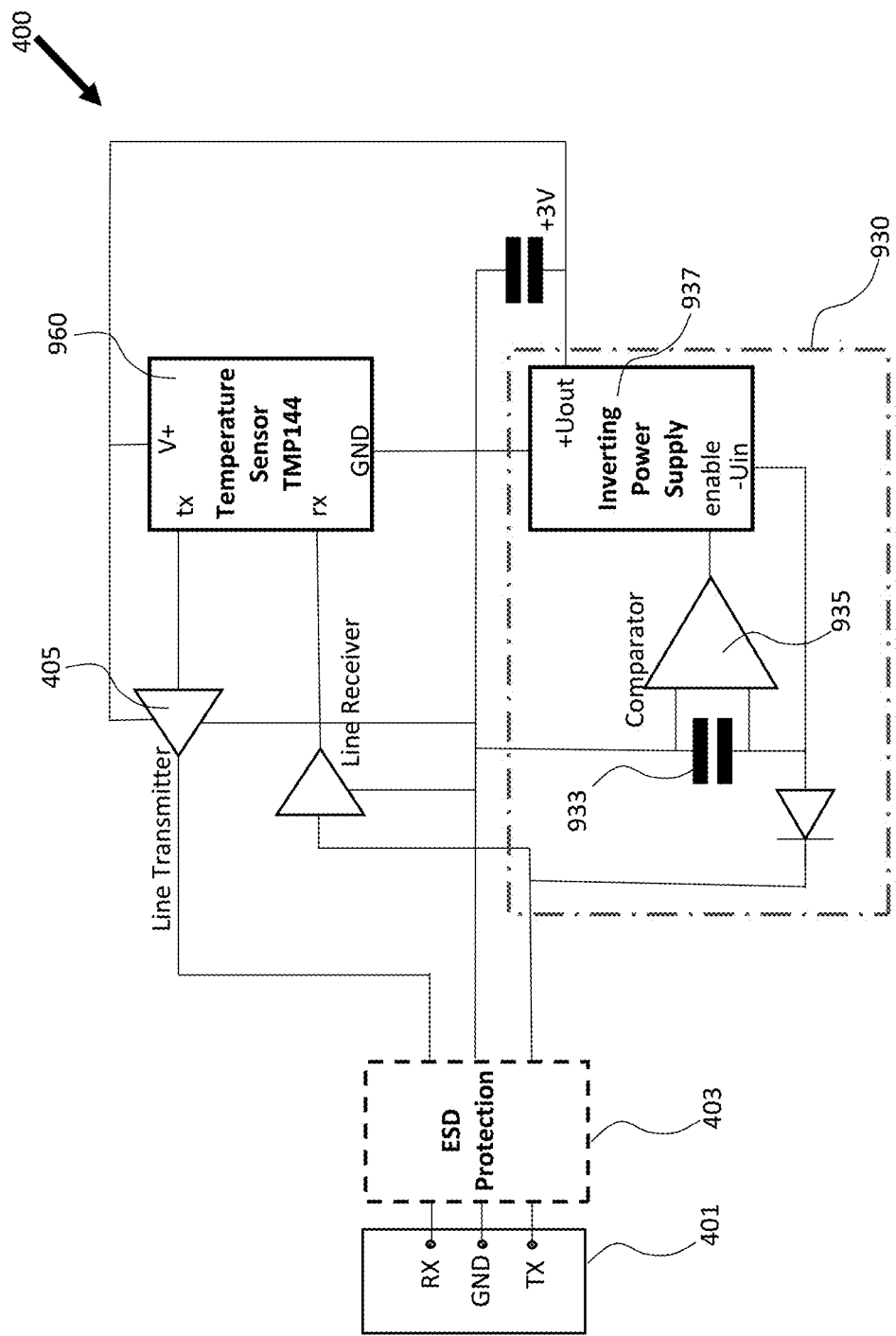

In still another aspect of the present disclosure, FIG. 6E illustrates another exemplary embodiment of the present technology in which a temperature sensor 960 (e.g., TMP144) is configured to harvest or receive the operational power from the single ended TX line of the interface 401 with a negative idle state, through the power supply module 930 in an aspect of the present disclosure. The power supply module 930 may be configured to include an inverting power supply 937, a comparator 935 coupled to the inverting power supply 937, a capacitor 933 coupled to the comparator 935 and a diode. The comparator 935 is configured to turn on or off the inverting power supply 937 based on the energy stored in the capacitor 933.

The present disclosure provides a new novel design and application use of one or more of debug lines of an external device to power a low power or energy module for various small, low energy devices including Internet-of-Things (IoT) devices, thereby providing convenience during provisioning of the external host device or regular operation of the low power or energy modules. By way of example, various aspects of the present disclosure provide means for powering a low energy communication module such as a Bluetooth low energy module, an environmental sensor, a measurement sensor, or the like which may be powered and/or provisioned, without having to use a separate, additional AC adaptor or a separate battery on a premise site. As a result, the present technology disclosed herein provides not only ease and convenience but also the cost savings to the users and staff alike.

In the present disclosure, a singular form may include a plural form if there is no clearly opposite meaning in the context. Also, as used herein, the article "a" is intended to include one or more items. Further, no element, act, step, or instruction used in the present disclosure should be construed as critical or essential to the present disclosure unless explicitly described as such in the present disclosure.

As used herein, except explicitly noted otherwise, the term "comprise" and variations of the term, such as "comprising," "comprises," and "comprised" are not intended to exclude other additives, components, or steps. The terms "first," "second," and so forth used herein may be used to describe various components, but the components are not limited by the above terms. The above terms are used only to discriminate one component from other components, without departing from the scope of the present disclosure. Also, the term "and/or" as used herein includes a combination of a plurality of associated items or any item of the plurality of associated items. It is also noted that when it is described that an element is "coupled" or "connected" to another element, the element may be directly coupled or directly connected to the other element, or the element may be coupled or connected to the other element through a third element. Also, the term "include" or "have" as used herein indicates that a feature, an operation, a component, a step, a number, a part or any combination thereof described herein is present. Further, the term "include" or "have" does not exclude a possibility of presence or addition of one or more other features, operations, components, steps, numbers, parts or combinations.

Although the present technology has been illustrated with specific examples described herein for purposes of describing example embodiments, it is appreciated by one skilled in the relevant art that a wide variety of alternate and/or equivalent implementations may be substituted for the specific examples shown and described without departing from the scope of the present disclosure. As such, the present disclosure is intended to cover any adaptations or variations of the examples and/or embodiments shown and described herein, without departing from the spirit and the technical scope of the present disclosure.

What is claimed is:

1. A wireless communication device configured to be used with a photonic service demarcation device including a debug interface, the wireless communication device comprising:
   a low power communication module;
   a power supply module coupled to the low power communication module;
   wherein the power supply module comprising:
      a power supply configured to supply power to the low power communication module;
      a comparator coupled to the power supply;
      an input buffer comprising an energy storage, the input buffer being coupled to the comparator of the power supply module; and
      a diode coupled to the input buffer and a transmission (TX) signal line of the debug interface, the TX signal line of the debug interface being configured to transmit data,
   wherein electrical energy is harvested from the TX signal line of the debug interface and stored into the energy storage via the diode disposed between the input buffer and the TX signal line of the debug interface, and
   wherein the comparator of the power supply module is configured to:
      enable the power supply to supply power to the low power communication module when an amount of energy stored in the energy storage reaches a minimum threshold of energy stored, and
      switch off the power supply to the low power communication module if a power demand is not sustainable or runs the TX signal line of the debug interface above a predetermined minimum space voltage.

2. The wireless communication device of claim 1, wherein the debug interface comprises a 3-wire RS-232 interface including the TX signal line, a receive (RX) signal line, and a ground line.

3. The wireless communication device of claim 2, wherein the energy storage of the input buffer is charged through the diode using available power over TX voltage from the TX signal line of the 3-wire RS-232 interface of the external device.

4. The wireless communication device of claim 1, wherein the low power communication module comprises a Bluetooth low energy (BLE) module.

5. The wireless communication device of claim 4, wherein the power supply is configured to provide power to the BLE module at an output voltage of +3V when the power supply is enabled by the comparator.

6. The wireless communication device of claim 4, further comprising a line receiver coupled to the BLE module, wherein the line receiver is configured to interface with the TX signal line of the debug interface of the photonic service demarcation device and an output of the line receiver is coupled to an input of the BLE module.

7. The wireless communication device of claim 1, wherein the low power communication module comprises a temperature sensor module.

8. The wireless communication device of claim 1, wherein the low power communication module comprises a global positioning system (GPS) module, a pressure sensor module, a humidity sensor module, or a $CO_2$ sensor module.

9. The wireless communication device of claim 8, wherein the one or more auxiliary equipment comprise a line transmitter, a receiver, a reset monitor, or the like disposed in the wireless communication device.

10. The wireless communication device of claim 1, wherein the power supply comprises an inverting power supply configured to provide power to one or more auxiliary components disposed in the wireless communication device.

11. The wireless communication device of claim 1, further comprising a electrostatic discharge (ESD) protection disposed between the TX signal line of the debug interface of the photonic service demarcation device and the diode of the power supply module.

12. The wireless communication device of claim 1, wherein the debug interface comprises a 2-wire RS-232 interface including a data signal line and a ground line, and wherein the data signal line is configured to function as the TX signal line.

* * * * *